United States Patent [19]

Rudzinski

[11] Patent Number: 5,032,263
[45] Date of Patent: * Jul. 16, 1991

[54] BAR SCREEN AND RAKE APPARATUS

[75] Inventor: Stanley Rudzinski, Chicago, Ill.

[73] Assignee: Rudz Enterprises, Inc., Chicago, Ill.

[*] Notice: The portion of the term of this patent subsequent to Dec. 20, 2005 has been disclaimed.

[21] Appl. No.: 451,202

[22] Filed: Dec. 14, 1989

[51] Int. Cl.$^5$ .............................................. B01D 35/16
[52] U.S. Cl. ..................................... 210/159; 210/162
[58] Field of Search ............... 210/154, 159, 160, 162, 210/407, 413; 209/379, 385, 389; 99/570

[56] References Cited

U.S. PATENT DOCUMENTS

| | | | |
|---|---|---|---|
| 2,033,653 | 3/1936 | Schlapak et al. | 210/159 |
| 4,265,750 | 5/1981 | Meunier | 210/159 |
| 4,289,619 | 9/1981 | Sampson | 210/159 |
| 4,472,273 | 9/1984 | Hagihara | 210/159 |
| 4,725,366 | 2/1988 | Dacus | 210/159 |
| 4,792,394 | 12/1988 | Rudzinski | 210/159 |
| 4,857,182 | 8/1989 | Jackson | 210/159 |
| 4,917,796 | 4/1990 | Rudzinski | 210/159 |

FOREIGN PATENT DOCUMENTS

| | | | |
|---|---|---|---|
| 148022 | 11/1902 | Fed. Rep. of Germany | 210/162 |
| 133221 | 5/1933 | Fed. Rep. of Germany | 210/162 |
| 42141 | 10/1907 | Switzerland | 210/162 |
| 0685750 | 9/1979 | U.S.S.R. | 210/159 |
| 16059 | of 1908 | United Kingdom | 210/159 |

Primary Examiner—W. Gary Jones
Attorney, Agent, or Firm—Leydig, Voit & Mayer

[57] ABSTRACT

An apparatus for removing solids from a liquid flow stream comprising a bar screen for obstructing solids from the liquid flow stream and a reciprocal rake having a plurality of projection adapted for cooperation with the bars of the screen for removing solids accumulated thereon. The opposite sides of the rake are supported by guide rollers adapted for maintaining the rake projections in pre-determined relatively closely spaced relation to the bars during an upward raking stroke for effecting substantially complete removal of solids accumulated on the bars while preventing continued direct contact between the rake projections and the bars. The guide rollers in turn are supported on the rods of pivoting cylinders which are actuatable in response to downward return movement of the rake for pivoting the rake about its upper end and moving the projections thereof in a downwardly and outwardly arced path with respect to the screen for enabling the rake to engage solids and debris accumulated near the bottom of the screen.

32 Claims, 6 Drawing Sheets

BAR SCREEN AND RAKE APPARATUS

DESCRIPTION OF THE INVENTION

The present invention relates generally to an apparatus for removing solids from liquid flow streams, and more particularly, to an improved screen and rake apparatus for such purpose.

Screening devices commonly are used for removing solids from liquid flow streams, such as in waste water treatment systems, food processing lines, and the like. Such devices include a bar screen disposed in the liquid flow stream for screening solids and debris from the flow stream and a rake that is cyclically operated for removing the accumulated materials from the screen. The screen typically comprises a plurality of closely-spaced bars and the rake includes similarly-spaced teeth-like projections adapted for close interfitting relation between the bars. Since the bars often are designed with relatively small spacing so as to minimize the passage of solids through the screen, heretofore the operation of the rake has been problem prone, resulting from binding of the rake projections between the closely-spaced bars during the raking stroke, undesirable wear to the rake and screen, and the necessity for relatively large power units for operating the rake. When the spacing between the bars has been widened to overcome these problems, screening efficiency has been reduced. A further problem of such bar screen and rake apparatus is that solids tend to accumulate in greater masses near the bottom of the flow channel and screen. Downward movement of the rake on its return stroke frequently tends to force the accumulated solids downwardly into the mass, which impedes the ability of the rake to effectively engage and lift the solids on the next raking stroke.

It is an object of the present invention to provide a bar screen and rake apparatus which is adapted for more effective and complete removal of accumulated solids from liquid flow streams.

Another object is to provide a solids-removing apparatus as characterized above in which the rake is adapted for effectively removing accumulated solids from the bar screen without binding or undesirable wear of the rake projections and the bars of the screen.

A further object is to provide a bar screen and rake apparatus of the above kind that is adapted to maintain a predetermined, relatively close spatial relation between the rake projections and bar screen during the raking stroke for affecting substantially complete removal of accumulated solids from the screen without substantial contact therebetween.

Still another object is to provide a bar screen and rake apparatus of the foregoing type in which the rake is automatically moved outwardly in an arched path from the bar screen during the downward or return stroke of the rake for permitting more efficient and complete engagement and lifting of masses of solid materials that accumulate near the bottom of the flow channel and bar screen.

Yet another is to provide a bar screen and rake apparatus of such type which is selectively adaptable for the particular environment within which it is to be used.

Another object is to provide such a bar screen and rake apparatus which is relatively simple and economical in construction and is adapted for more efficient, dependable, and maintenance free operation.

Other objects and advantages of the invention will become apparent upon reading the following detailed description and upon reference to the drawings, in which:

While the invention is susceptible of various modifications and alternative constructions, a certain illustrated embodiment thereof has been shown in the drawings and will be described below in detail. It should be understood, however, that there is no intention to limit the invention to the specific form disclosed, but on the contrary, the intention is to cover all modification, alternative constructions and equivalents falling within the spirit and scope of the invention.

Figure 1:
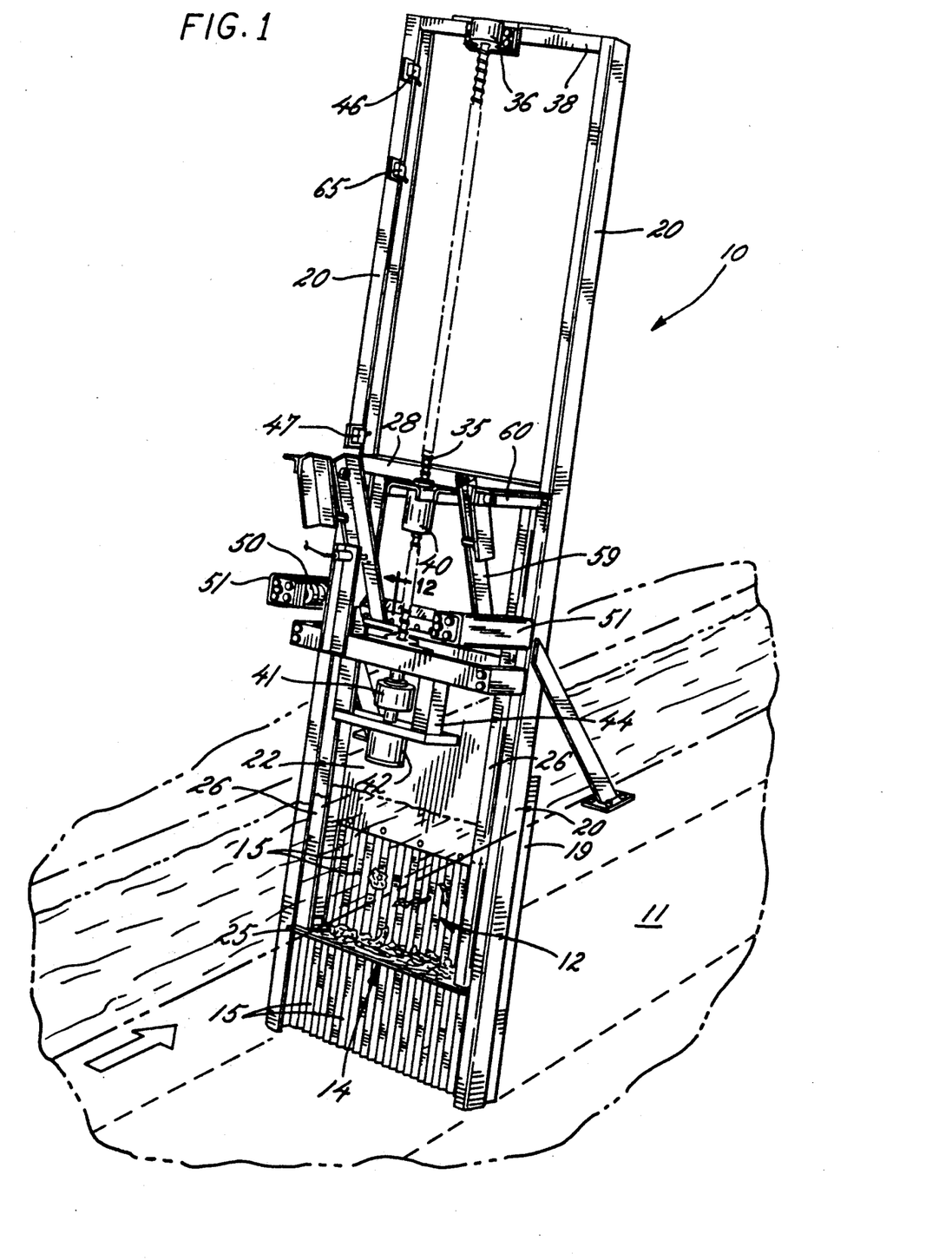
FIG. 1 is a perspective of an illustrated bar screen and rake apparatus embodying the present invention disposed in a liquid flow stream.
Figure 2:
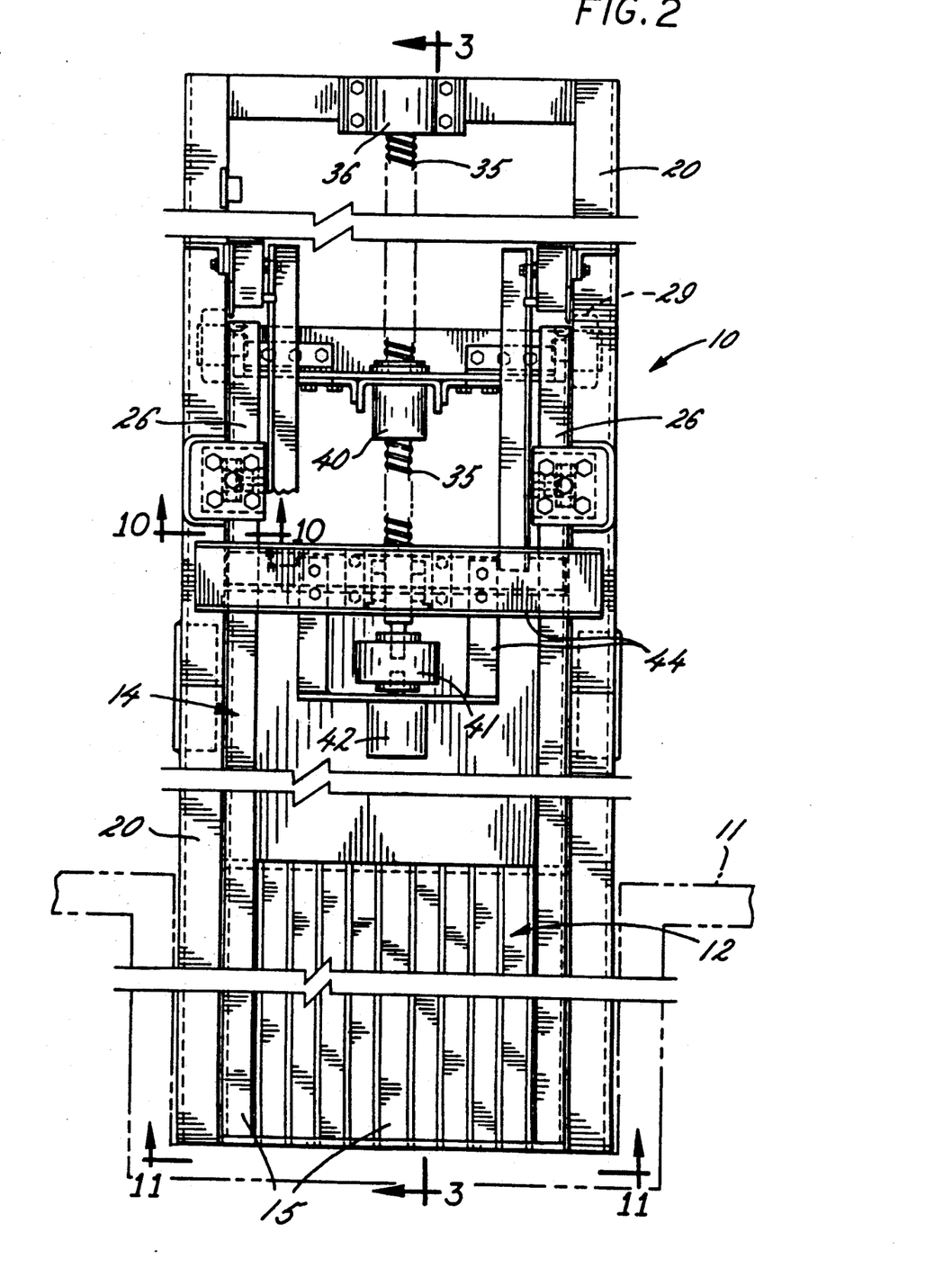
FIG. 2 is a front elevational view of the illustrated bar screen and rake apparatus.

Referring now more particularly to the drawings, there is shown a solids removal apparatus 10 embodying the present invention, which is disposed in a flow channel 11 through which a liquid flow stream is passing in the direction of the arrow (FIG. 1). The illustrated flow stream may be part of a waste treatment system, a fruit or vegetable washing or processing operation, or other processing line in which the stream carries solid materials that must be separated and removed from the liquid. The apparatus 10 comprises a bar screen 12 for separating solids from the moving liquid flow stream and a rake 14 for removing solids that accumulate on the bar screen 12 as a result of the screening process. The bar screen 12 may be of a type disclosed in applicant's aforesaid U.S. Pat. No. 4,792,394, the disclosure of which is incorporated herein by reference.

Figure 11:
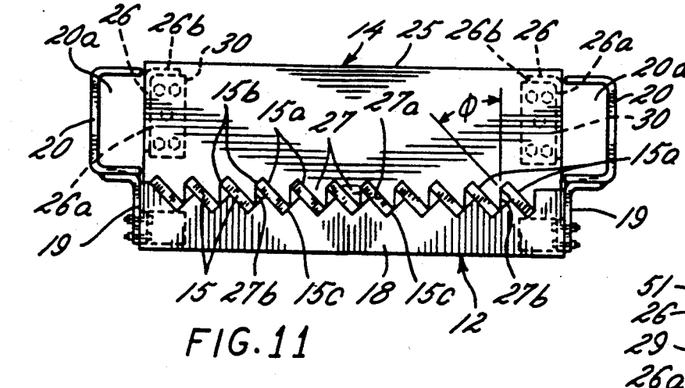
FIG. 11 is a bottom end view of the illustrated bar screen taken in the plane of line 11—11 in FIG. 2.

The illustrated bar screen 12 consists of a plurality of flat bars 15 (FIG. 11) disposed in closely-spaced parallel relation between upper and lower support bars 16, 18 (FIG. 3) for defining a plurality of narrow, elongated flow openings therebetween. The bar screen 12 is mounted on a pair of support rails 19 in the flow stream, which in turn are affixed to the rear side of a respective pair of upstanding channels 20 disposed on opposite sides of the bar screen 12 (FIGS. 1 and 11). The channels 20 in this instance have openings 20a in opposed relation to each other. The bar screen 12 and support channels 20 lie in parallel inclined planes with their upper ends slanted slightly in the downstream direction. A dead plate 22 is mounted between the channels 20 immediately above the screen 12 for the purpose of preventing solids from dropping on the downstream side of the screen 12 during the raking and removal process, as will become apparent.

The bars 15 of the screen 12 each have an upstream relatively flat face 15a disposed at an acute angle $\phi$ with respect to the longitudinal axis of the flow channel at the point in which the screen 12 is mounted, and hence, with respect to the direction of travel of the liquid flow stream. Preferably, the leading edge 15b of one bar is in substantial longitudinal alignment with the trailing edge 15c of the adjacent bar. Such arrangement effectively prevents a direct gap from being offered to solid materials in relation to the direction of movement of the flow stream by presenting a virtual plane of obstruction perpendicular to the flow of solids, yet defining sufficiently wide openings between adjacent bars to allow the substantially unimpeded flow of the liquid portion of the flow stream through the screen.

For removing solids that accumulate on the bar screen 12, the rake 14 includes a lifting plate 25 formed with a series of projections 27 designed for cooperative positioning with respect to the bars 15 (FIG. 11). The lifting plate 25 is connected between the lower ends of a pair of upwardly extending connected by a cross brace 28 and supported for transactional movement in the channels 20 by a pair of rollers 29. The linking arms 26 in this case in L-shaped angles, each having one leg 26a disposed in a vertical plane adjacent the side of the lifting plate 25 and a second right angle leg 26b extending inwardly therefrom. Opposite ends of the lifting plate 25 are bolted to a respective securement plate 30, in which in turn is welded to the linking arm 26 (FIG. 11).

The rake projections 27 are generally V-shaped each having a first slanted edge or side 27a with a slope corresponding to the angle of the upstream faces 15a of the bars 15 so as to permit positioning of the rake edges 27a into closely adjacent relation to the upstream faces 15a of the respective bars. The other edge or side 27b of each projection 27 i substantially vertically oriented. Such arrangement permits positioning of the rake projections 27 between the slanted bars 15 of the screen 12, as depicted in FIG. 11, so that when the rake is moved longitudinally along the bars of the screen, it effectively removes solid materials that have accumulated or are adhering to the surfaces of the bars.

For operating the rake 14 during the raking stroke to effect removal of the accumulated solids on the screen 12, a ball screw drive 35 is provided. The ball screw 35 is rotatably supported at it upper end by a bearing 36 mounted on a cross brace 38 extending between the upstanding channels 20. The ball screw 35 is adapted for operative engagement with a bal nut 40 mounted on the cross brace 28 of the rake 14. For driving the ball screw 35, the lower end thereof is connected through a coupler 41 to a hydraulic motor 42 mounted on a cross brace 44 also connected between the support channels 20. While the hydraulic motor 42 is shown as being connected to the lower end of the ball screw 35, it will be understood that alternatively it could drive the upper end of the screw. Upon selected rotatable driving movement of the ball screw 35, it will be seen that the ball nut 40, and thus the rake 14 connected thereto, may be raised and lowered relative to the screen 12 with rolling movement of the rollers 29 of the rake 12 being guided by the channels 20. Operation of the hydraulic motor 42, and hence raising and lowering of the rake 12, may be controlled by respective upper and lower movement limit switches 46, 47 disposed on one of the support channels 20, which are engageable by the rake.

In accordance with the invention, means are provided for selectively positioning and maintaining the rake projections in predetermined spaced relation to the bars of the screen throughout its upward movement during a raking stroke for preventing continued direct contact therebetween in order to minimize wear and prevent binding. To this end, movement of the link arms 26 of the rakes 14 are guided between respective pairs of guide rollers 48, 49, each being mounted on a hydraulic cylinder 50 located adjacent one side of the rake 14 intermediate the upper and lower ends thereof. For supporting each hydraulic cylinder 50, a support channel 51 is affixed inforwardly extending relation to each of the support channels 20 on the upstream side thereof. Each hydraulic cylinder 50 has one end channel 51 and includes a selectively actutable cylinder rod 52 extending from the other end. The rod 52 of each cylinder carries a respective pair of the rollers 48, 49 in closely adjacent relation to each other for receiving therebetween and guiding movement of the inwardly turned leg 26b of the respective link arm 26. The pairs of rollers 48, 49 in this case each are connected to the cylinder rod 52 by a L-shaped flange 54 that is selectively positionable on an end of the rod 52.

Figures 3, 4:
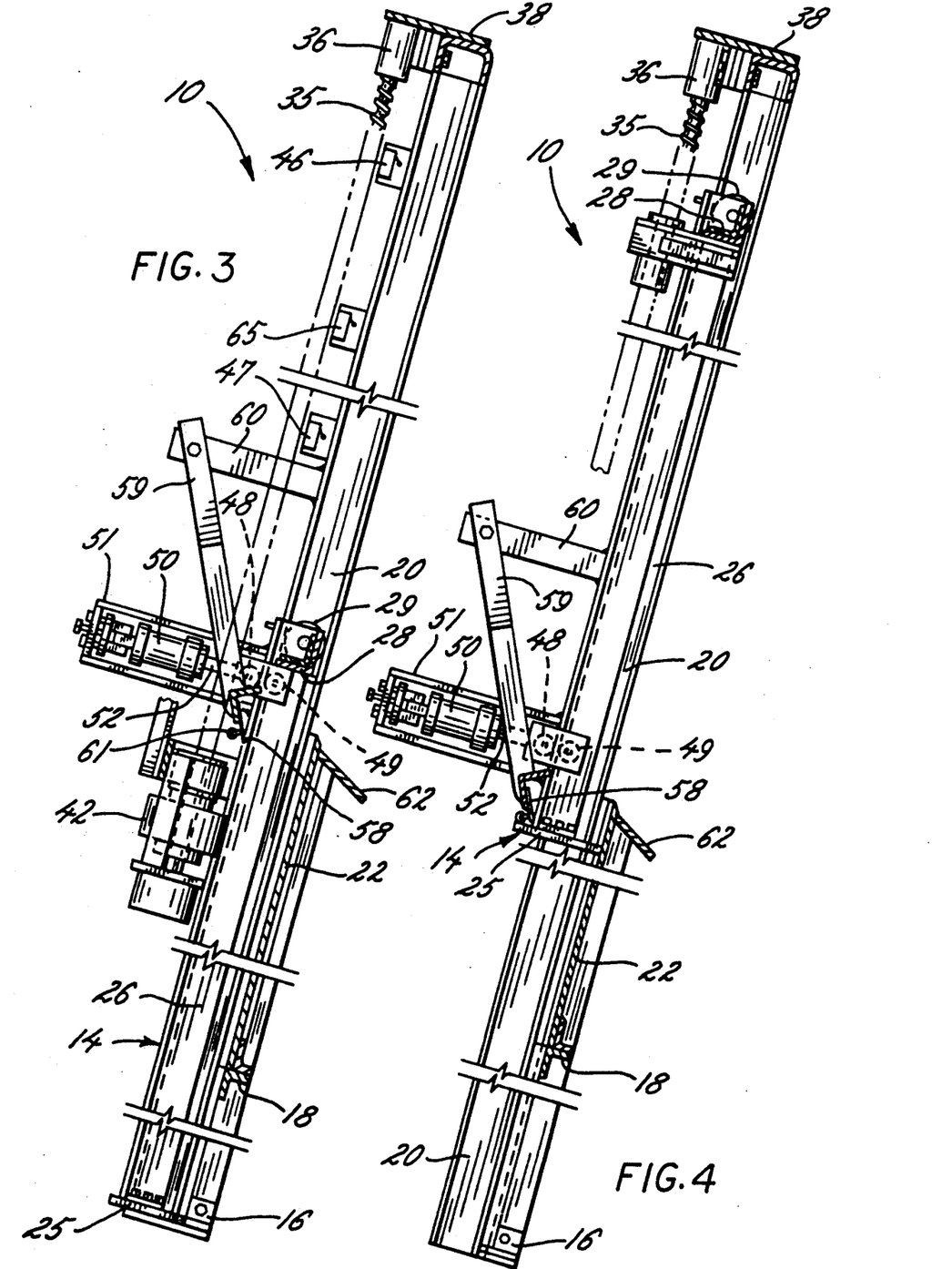
FIG. 3 is a vertical section of the illustrated apparatus taken in the plane of line 3—3 in FIG. 2.
FIGS. 4–7 are vertical sections, similar to FIG. 3, illustrating operation of the rake of the illustrated apparatus.
Figures 5, 6:
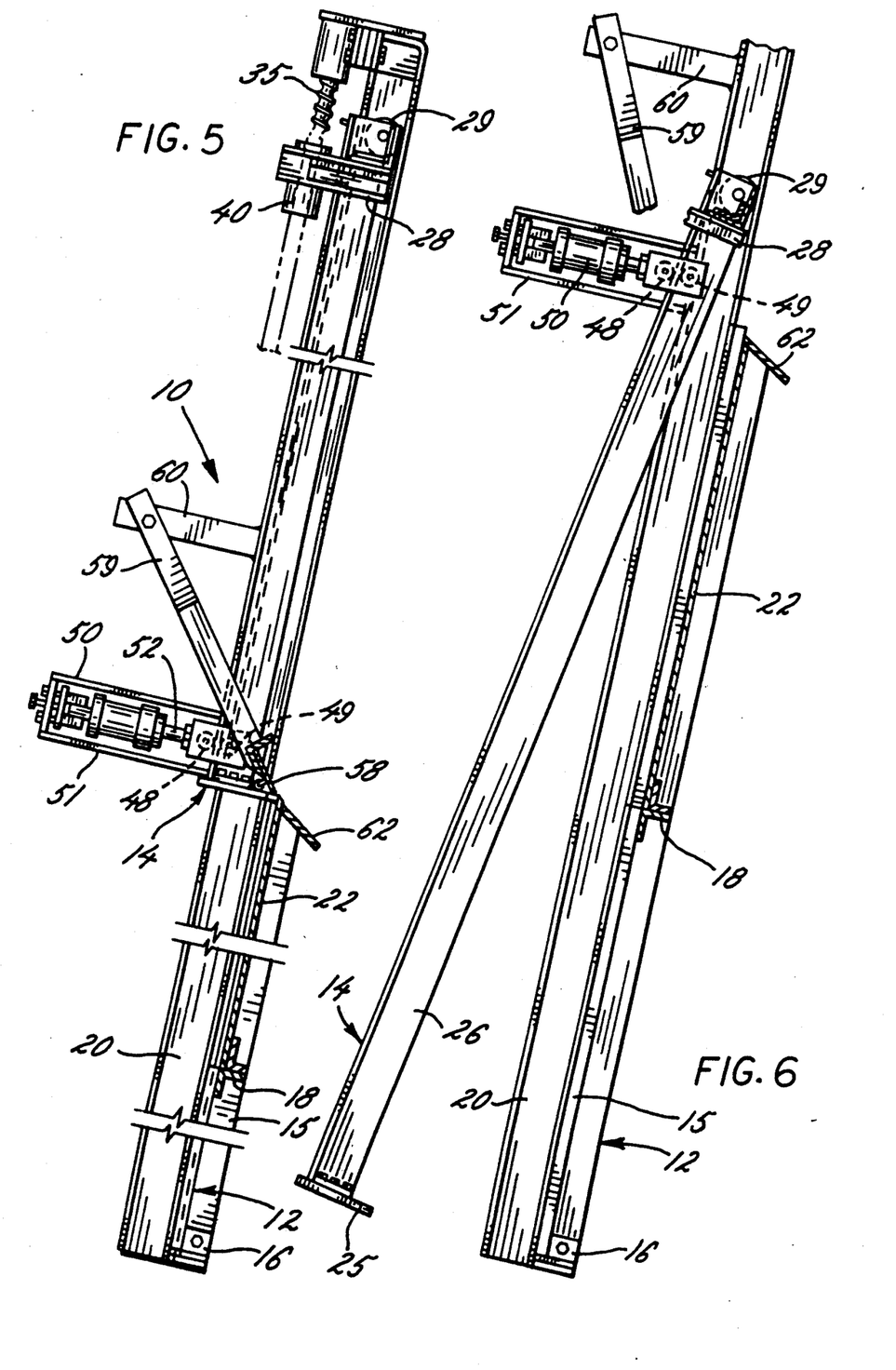
Figures 7, 8, 9:
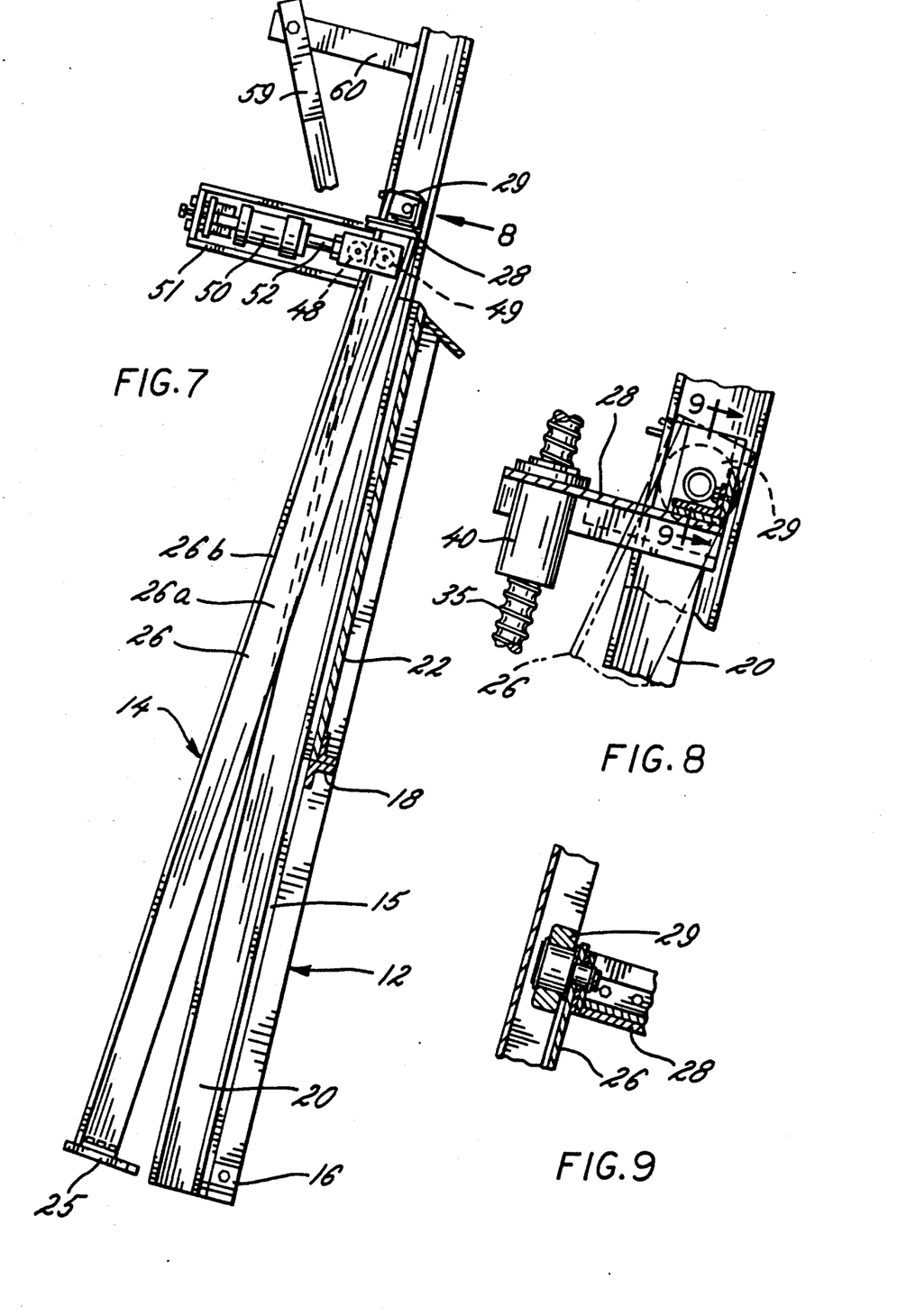
FIG. 8 is an enlarged fragmentary section taken in the plane of line 8—8 in FIG. 7.
FIG. 9 is a fragmentary section taken in the plane of line 9—9 in FIG. 8.
Figure 10:
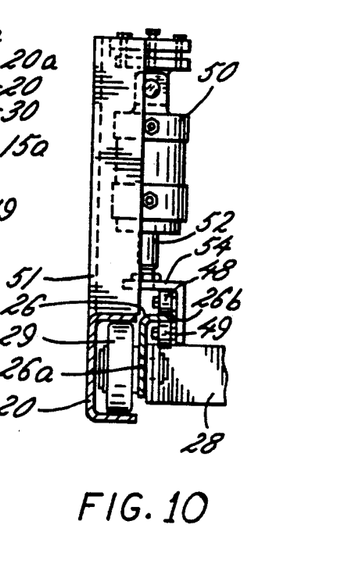
FIG. 10 is a fragmentary section taken in the plane of line 10—10 in FIG. 2.

By establishing the position of the rollers 49, 49 on the outward stroke of the cylinder rod 52, the rollers 48, 49 can be located so as to guide movement of the rake 14, and hence the lifting plate 25 thereof, relative to the screen 12 so that the rake projections 27 are maintained in relatively closely spaced relation to the bars 15 on the screen during the upward raking stroke (FIGS. 3 and 4). In practice, it has been found that the projections 27 may be maintained with relatively small spacing, such as a separation of between about 0.005 to 0.020 inches between the inclined edges 27a of the rake projections and the adjacent upstream faces 15a of the bars. Such spacing has been found to enable substantially complete removal of solids from the screen during the raking stroke, including even relatively fine gauge paper and the like having thicknesses as low as 0.006 inches, while preventing continued contact, engagement or binding between the projections and the bars. Occasional contact that might occur between ne or more of the teeth and the bars of the screen due to turbulence about the screen or debris striking the rake is limited and does not result in significant wear.

Figure 12:
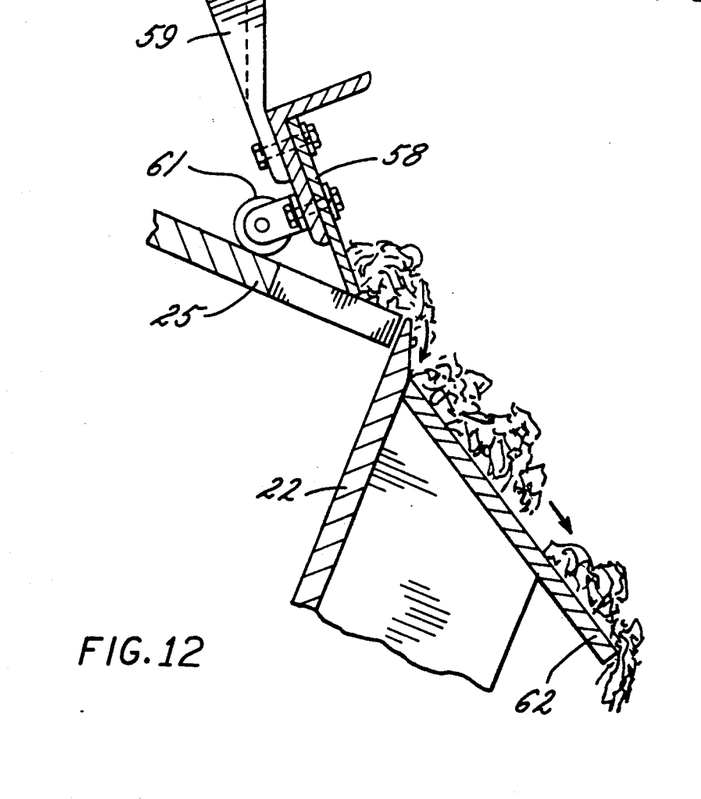
FIG. 12 is a vertical section depicting operation of the wiper device for removing accumulated solids from the rake of the illustrated apparatus.

To remove debris and solids carried upwardly by the lifting plate 25 of the rake 14 during a raking stroke, a wiper blade 58 is provided adjacent to desired discharge location, as best shown in FIGS. 3, 4 and 12. The wiper blade 58 is supported at opposed ends by arms 59 pivotally mounted on supports 60 extending forwardly of the channels 20. The wiper blade 58 and arms 59 normally are located in a downwardly pivoted or inactive position (FIG. 3). Alternatively, an appropriate return spring may be provided for origin the arms to such inactive position. As the rake 14 approaches the discharge location (FIG. 3) during its upward raking stroke, the lifting plate 25 of the rake 14 will engage the underside of the wiper blade 58. Further upward movement of the rake 14 thereupon causes the wiper blade 58 to pivot in a counterclockwise direction, as viewed in FIGS. 3 and 4, which in turn causes the wiper blade 58 to move across the lifting plate 25 and force solids carried thereon to the right, as viewed in FIGS. 4 and 12. Rollers 61 are mounted on the underside of the wiper blade 58 to facilitate movement of the blade across the lifting plate 25 of the rake, while preventing contact and wear between the wiper blade 58 and lifting plate 25. As is known in the art, as the solids are pushed off the rake, they may be directed into a container, bin, or movable conveyor for transfer to a disposal location. A downwardly inclined guide plate 62 in this instance is mounted at the upper end of the dead plate 22 for directing the ejected solids (FIG. 12). Upon lowering the rake 14 at the commencement of the return stroke through operation of the hydraulic motor 42 in the reverse direction, the rake will pivot 14 in a clockwise direction to its original position, shown in FIG. 3, by gravity.

In carrying out the invention, means are provided during the downward or return movement of the rake for pivoting the rake outwardly away from the screen, and thus, moving the lifting plate thereof progressively outwardly in an arced path for permitting more efficient engagement of debris which concentrates near the bottom of the screen. To this end, a switch 65 is mounted on one of the support channels 20 is engaged by the rake 14 during downward movement, during a raking stroke for preventing cylinders 50 are actuated to retract their cylinder rods 52 and thereby pivot the rake 14 about the upper rollers 29 away from the screen 12 in the upstream direction. It will be seen that upon actuation of the switch 65 and cylinders 50 retracting movement of the rods 52 and the rollers 48, 49 carried thereby will pull the rake 14 outwardly away from the screen 12, causing it to pivot about the rollers 29. Moreover, upon complete retraction of the cylinder rods 52 and rollers 48, 49, continued downward movement of the rake 14 will increase the pivot angle of the rake 14 relative to the screen 12 as the upper support rollers 29 of the rake move closer to the stationary rollers 48, 49 of the pivoting cylinders 51. Since the lower end of the rake 14 comprises only the lifting plate 25, without support rollers, it is relatively light in weight, and as a result, can be positioned relative to the screen 12 through actuation of the hydraulic cylinders 50 with relative ease. Because the pivot angle between the rake 14 and screen 12 increases during downward movement of the rake, the lower end of the rake is moved in a progressively widening arc so as to move around masses of solid materials and debris which accumulate near the bottom o the rake. When the rake 14 completes its downward movement and actuates the switch 47, the hydraulic cylinders 50 may be actuated in the reverse direction to extend the rods 52 and move the lower end of the rake to a ready position for the next raking stroke in closely spaced relation to the screen 14. It will be appreciated that hydraulic actuation of the rake 14, motor 42 and the pivoting hydraulic cylinders 50 permits relatively smooth movement of the rake 14 without sudden shock. The hydraulic pump for the motor 42 and pivoting cylinders 50 also may be remotely located so as to eliminate potentially hazardous electrical installations near the flow stream.

In operation of the solids removal apparatus 10, prior to commencement of the upward raking stroke, the rake 14 will be located in a ready position near the bottom of the screen 12 with the rake projections 27 in closely spaced relation to the bars 15 of the screen 12 as established by the extended position of the hydraulic cylinder rods 52 and the rollers 48, 49 carried thereby. Operation of the hydraulic motor 42 will raise the rake 14, causing the lifting plate 25 thereof to engage and remove solids accumulated on the screen 12. Since the pivoting cylinder rollers 48, 49 guide lifting movement of the rake 14, the rake projections 27 may be maintained in relatively closely spaced relation to the bars 15 of the screen during the raking stroke so as to prevent continued contact therebetween, and thereby, prevent excessive wear. As lifting plate 25 of the rake approaches its uppermost or discharge position, it will engage the underside of the wiper blade 58, causing the wiper blade 58 to be pivoted in a counterclockwise position, as viewed in FIGS. 3 and 4, which in turn moves the wiper blade 58 across the top of the lifting plate 25 of the rake, causing solids carried thereon to be pushed off and discharged over the directing plate 62 into a container or receiving bin for transfer to a disposal location.

Upon the rake reaching the discharge position and engaging the switch 46, the hydraulic motor 42 is reversed, which in turn initiates the downward or return stroke of the rake 14. Upon actuation of the switch 65 during such downward travel, the pivoting cylinders 50 are actuated to retract the rods 52 and pivot the rake 14 about its support rollers 29. Continued downward movement of the rake 14 with the cylinder rod 52 and rollers 48, 49 in their retracted position, causes continued pivoting of the rake 14 outwardly from the screen 12, with the lifting plate 25 moving in an arced path with the greatest clearance from the screen 12 being adjacent the bottom thereof where the greatest accumulation of solids and debris occurs. Upon reaching the end of the return stroke, the switch 37 is actuated to terminate operation of the hydraulic motor 42 and cause the pivoting hydraulic cylinders 50 to move their cylinder rods 52 and the rollers 48, 49 carried thereby to their extended position returning the rake 14 to its ready position in closely adjacent relation to the screen 12. It will be understood that the frequency of operation of the rake 14 can be controlled automatically by known means, depending upon the levels and the type and content of solids in the liquid flow stream. The operation of the rake 14 is also easily adaptable for field adjustment. An override switch also may be provided to interrupt the raking stroke in the event an obstruction or excessive load is incurred during the raking stroke, or alternatively, to actuate the positioning cylinders 50 to move the rake 14 away from the screen 12 to permit clearance of the obstruction.

From the foregoing, it can be seen that the bar screen and rake apparatus of the present invention is adaptable for more effective and complete removal of solids from liquid flow streams. This is effected without continued contact between the rake projections and bar screen, and hence, without binding or excessive wear to the rake projections and the bars. Moreover, on the downward return stroke of the rake, the lifting plate is automatically moved in an outwardly arced path from the bar screen for permitting complete engagement of solids accumulating near the bottom of the screen. The bar screen and rake apparatus also is relatively simple and economical in construction, is adapted for efficient, dependable and maintenance free operation, and lends itself to selected adaptability for the particular environment within which it is to be used.

I claim as my invention:

1. An apparatus for removing solids from a liquid flow stream comprising a flow channel for a directing solids containing liquid flow stream along a predetermined path corresponding substantially to the longitudinal axis of said flow channel, a bar screen transversely mounted at a predetermined location in said flow channel, said bar screen including a plurality of bars, means for mounting said bars in parallel spaced relation to each other for obstructing the passage of solids from the liquid flow stream while defining elongated liquid flow openings therebetween, a reciprocal rake having a plurality of projections for removing solids obstructed from the flow stream and accumulated on said bars, means for raising said rake during an upward raking stroke and lowering said rake during a return stroke, and means for maintaining aid rake projection in predetermined relatively closely spaced relation to said bars during said upward raking stroke for affecting substantially complete removal of solids accumulated on said bars while preventing continued direct contact between the rake projections and bars.

2. The apparatus of claim 1 including means for moving said rake such that the projections thereof travel in a downwardly and outwardly arced path with respect to said screen during the return stroke of said rake for enabling said rake to engage solids accumulated near the bottom of said screen for removal during the next raking stroke.

3. The apparatus of claim 2 including means for supporting said rake for pivotal movement about an upper end thereof relative to said screen, and means for pivoting said rake outwardly relative to said screen during said return stroke.

4. The apparatus of claim 3 including guide rail means extending upwardly of said screen, and roller means supporting an upper end of said rake for translational and pivotal movement relative to said guide rail means.

5. The apparatus of claim 1 in which said means for maintaining said rake projections in closely spaced relation to said bars includes guide rollers engageable with opposite sides of said rake for guiding rake movement during the upward raking stroke.

6. The apparatus of claim 5 including means for supporting said rake for pivotal movement about an upper end thereof.

7. The apparatus of claim 6 including means for moving said rake such that the projections thereof travel in said downwardly and outwardly arced path, said rake moving means includes means for moving said guide rollers transversely to said screen for pivoting said rake about its upper end during said return stroke.

8. The apparatus of claim 7 in which said guide rollers transverse moving means includes cylinders each having a respective cylinder rod carrying a respective pair of said guide rollers, and means for actuating said cylinders to extend and retract the said cylinder rods and the guide rollers carried thereby.

9. The apparatus of claim 8 in which said cylinders are mounted in forwardly directed relation to said screen and each have a rearwardly extending guide roller carrying cylinder rod coupled to said rake.

10. The apparatus of claim 8 including means responsive to movement of said rake during said downward return stroke for actuating said cylinders.

11. The apparatus of claim 5 in which said rake includes a lifting plate having said projections on one side thereof upon which solids are carried during said upward raking stroke, linking members extending upwardly from opposite sides of said lifting plate, and said rake linking members being supported by said guide rollers during said upward and downward movement of said rake.

12. The apparatus of claim 11 including guide channels extending upwardly of said screen, and support rollers supporting the upper end of said rake for rolling movement in said guide channels during said raking and return strokes.

13. The apparatus of claim 11 in which said guide rollers are disposed at a location intermediate the upper and lower ends of said rake.

14. The apparatus of claim 11 in which said linking members are L-shaped angles each having one leg disposed in a vertical plane adjacent a side of said lifting plate and a second right angle leg extending inwardly therefrom, and said guide rollers are disposed on opposite sides of said right angle legs for guiding movement of said linking members during said raking and return strokes.

15. The apparatus of claim 11 including pivotally mounted wiper blade means actutable upon movement of said rake upwardly during said raking stroke for causing said wiper blade means to move across said lifting plate and eject solids carried thereon, and roller means for supporting said wiper blade for rolling movement across the lifting plate.

16. The apparatus of claim 1 in which said means for raising and lowering said rake includes a drive motor and a ball screw assembly coupled between said drive motor and said rake.

17. The apparatus of claim 1 in which said bars each have an upstream face with a leading edge on one side thereof and a trailing edge on the other side thereof, and said bars are supported by said mounting means such that the upstream faces thereof are disposed at an acute angle to the longitudinal axis of said flow channel at said predetermined location with the trailing edge of each bar transversely offset from the leading edge of the bar when viewed along said longitudinal axis.

18. The apparatus of claim 17 in which said bars each are supported by said mounting means such that the leading edge of each bar is in substantial alignment with the trailing edge of an adjacent bar when viewed along said longitudinal axis.

19. The apparatus of claim 17 in which said projections each have a generally V-shaped configuration, said projects being formed with one face that is positionable in substantially parallel relation to the upstream face of a respective one of said bars.

20. An apparatus for removing solids from a liquid flow stream comprising a flow channel for directing a solids containing liquid flow stream along a predetermined path corresponding substantially to the longitudinal axis of said flow channel, a bar screen transversely mounted at a predetermined location in said flow channel, said bar screen including a plurality of bars, means for mounting said bars in parallel spaced relation to each other for obstructing the passage of solids from the liquid flow stream while defining elongated liquid flow openings therebetween, a reciprocal rake having a plurality of projections at the lower end thereof for removing solids obstructed from the flow stream and accumulated on said beam, means for raising said rake during an upward raking stroke and lowering said rake during a return stroke, guide rollers mounted remote from the rake for supporting opposite sides of the rake for relative movement and for guiding rake movement during the upward raking and return strokes, and means for selectively moving said guide rollers in a transverse direction relative to the plane of said screen for moving said rake outwardly relative to said screen following completion of said raking stroke and prior to completion of said return stroke for enabling the rake to engage solids accumulated near the bottom of said screen for removal during the next raking stroke.

21. The apparatus of claim 20 including means responsive to movement of said rake during said downward return stroke for actuating said cylinders.

22. The apparatus of claim 20 in which said rake includes a lifting plate having said projections on one side thereof, linking members extending upwardly from opposite sides of said lifting plate, and said rake linking members being supported by said guide rollers during said raking and return strokes.

23. The apparatus of claim 20 including guide channels extending upwardly of said screen, and support rollers supporting the upper end of said rake for rolling movement in said guide channel during said raking and return strokes.

24. An apparatus for removing solids from a liquid flow stream comprising a flow channel for directing a solids containing liquid flow stream along a predetermined path corresponding substantially to the longitudinal axis of said flow channel, a bar screen transversely mounted at a predetermined location in said flow channel, said bar screen including a plurality of bars, means for mounting said bars in parallel spaced relation to each other for obstructing the passage of solids from the liquid flow stream while defining elongated liquid flow openings therebetween, a reciprocal rake having a plurality of projections at the lower end thereof for removing solids obstructed from the flow stream and accumulated on said bars, means for raising said rake during an upward raking stroke and lowering said rake during a return stroke, means for supporting said rake for pivotal movement about an upper end thereof relative to said screen, means for pivoting said rake outwardly relative to said screen about said supporting means during said return stroke such that the projections thereof travel in a downwardly and outwardly arced path with respect to said screen for enabling the rake to engage solids accumulated near the bottom of said screen for removal during the next raking stroke, said rake pivoting means including rollers engageable with opposite sides of said rake for guiding rake movement during the upward raking and return strokes, cylinders each having a respective cylinder rod carrying a respective pair of said guide rollers, and means for actuating said cylinders to extend and retract said cylinder rods and the guide rollers carried thereby for moving said guide rollers transversely to said screen and pivoting said rake about said supporting means.

25. An apparatus for removing solids from a liquid flow stream comprising a flow channel for directing a solids containing liquid flow stream along a predetermined path corresponding substantially to the longitudinal axis of said flow channel, a bar screen transversely mounted at a predetermined location in said flow channel, said bar screen including a plurality of bars, means for mounting said bars in parallel spaced relation to each other for obstructing the passage of solids from the liquid flow stream while defining elongated liquid flow openings therebetween, a reciprocal rake having a plurality of projections at the lower end thereof for removing solids obstructed from the flow stream and accumulated on said bars, means for raising said rake during an upward raking stroke and lowering said rake during a return stroke, means for maintaining said rake projection in predetermined relatively closely spaced relation to said bars during said upward raking stroke for effecting substantially complete removal of solids accumulated on said bars while preventing continued direct contact between the rake projections and bars, means for supporting said rake for pivotal movement about an upper end thereof relative to said screen, and means for pivoting said rake outwardly relative to said screen about said supporting means during said return stroke such that the projections thereof travel in a downwardly and outwardly arced path with respect to said screen for enabling the rake to engage solids accumulated near the bottom of said screen for removal during the next raking stroke.

26. An apparatus for removing solids from a liquid flow stream comprising a flow channel for directing a solids containing liquid flow stream along a predetermined path corresponding substantially to the longitudinal axis of said flow channel, a bar screen transversely mounted at a predetermined location in said flow channel, said bar screen including a plurality of bars, means for mounting said bars in parallel spaced relation to each other for obstructing the passage of solids from the liquid flow stream while defining elongated liquid flow openings therebetween, said bars each having an upstream face with a leading edge on one side thereof and a trailing edge on the other side thereof, said bars being supported by said mounting means such that the upstream faces thereof are disposed at an acute angle to the longitudinal axis of said flow channel at said predetermined location with the trailing edge of each bar transversely offset from the leading edge of the bar when viewed along said longitudinal axis, a reciprocal rake having a plurality of projections at the lower end thereof for removing solids obstructed from the flow stream and accumulated on said bars, said projections each having a generally V-shaped configuration with one face thereof being positionable in substantially parallel relation to the upstream face of a respective one of said bars, means for raising said rake during an upward raking stroke and lowering said rake during a return stroke, means for supporting said rake for pivotal movement about an upper end thereof relative to said screen, and means for pivoting said rake outwardly relative to said screen about said supporting means during said return stroke such that the projections thereof travel in a downwardly and outwardly arced path with respect to said screen for enabling the rake to engage solids accumulated near the bottom of said screen for removal during the next raking stroke.

27. The apparatus of claim 20 including means for supporting said rake for pivotal movement about an upper end thereof relative to said screen, and said guide roller moving means is operable for pivoting a lower end of said rake outwardly relative to said screen about said supporting means.

28. An apparatus for removing solids from a liquid flow stream comprising a flow channel for directing a solids containing liquid flow stream along a predetermined path, a bar screen transversely mounted at a predetermined location in said flow channel, said bar screen including a plurality of bars, means for mounting said bars in parallel spaced relation to each other for obstructing the passage of solids from the liquid flow stream while defining elongated liquid flow openings therebetween, a reciprocal rake having a plurality of projections for removing solids obstructed from the flow stream and accumulated on said bars, means for raising said rake during an upward raking stroke and lowering said rake during a return stroke, and fluid actuated cylinder means for selectively moving said rake outwardly from said screen after completion of said raking stroke and prior to completion of said return stroke for enabling the rae to engage solids accumulating near the bottom of said screen for lifting and removal during the next raking stroke.

29. The apparatus of claim 28 in which said cylinder means includes a pair of cylinders mounted on opposite sides of said screen, said cylinders each having a respective extendable and retractable cylinder rod, and means connecting said cylinders to said rake whereby extension of said cylinder rods move said rake in a direction outwardly from said screen.

30. The apparatus of claim 29 in which each said cylinder rod carries roller means for supporting a respective side of said rake while emitting raising and lowering of said rake relative to the cylinders during said raking and return strokes.

31. The apparatus of claim 30 in which said roller means for each cylinder rod includes a pair of rollers between which a respective side of said rake is disposed and guided during said raking and return strokes.

32. The apparatus of claim 28 including means for supporting said rake for pivotal movement about an upper end thereof relative to said screen, and said cylinder means is operative for pivoting a lower end of said rake relative to said screen abut said supporting means.

* * * * *